April 14, 1931. W. H. BOUTELLE 1,800,279
OPHTHALMIC MOUNTING
Filed Feb. 24, 1928
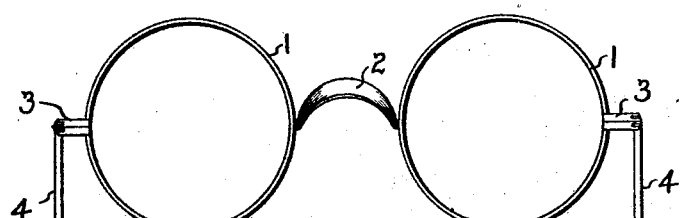
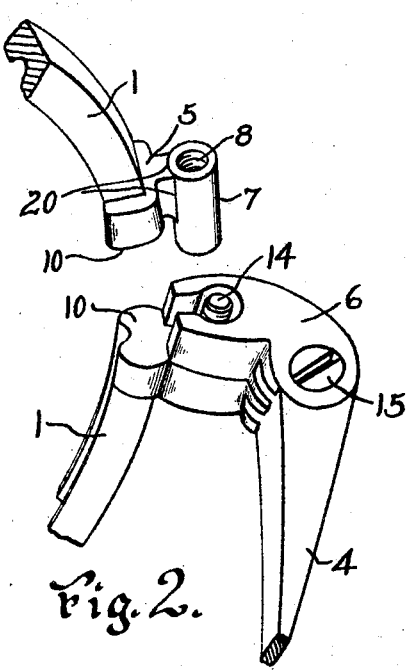
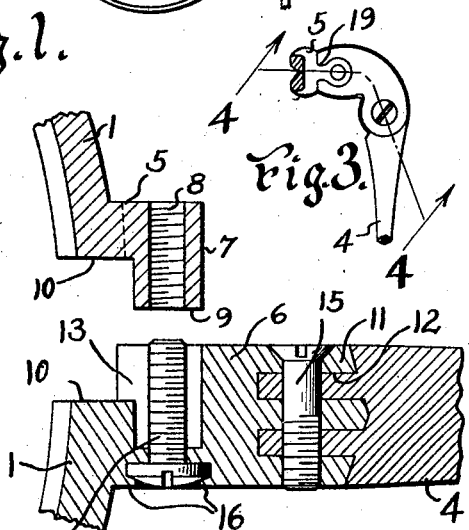
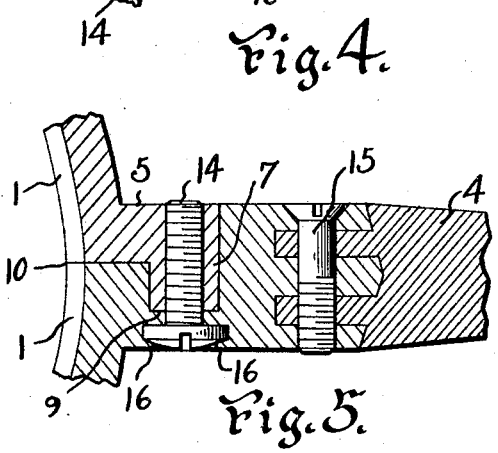
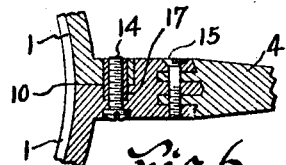
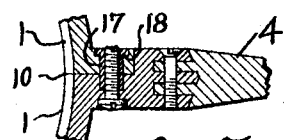
Inventor
William H. Boutelle.
By Harry H. Styll.
Attorney Patented Apr. 14, 1931　　　　　　　　　　　　　　1,800,279

UNITED STATES PATENT OFFICE

WILLIAM H. BOUTELLE, OF STURBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

OPHTHALMIC MOUNTING

Application filed February 24, 1928. Serial No. 256,618.

This invention relates to improvements in ophthalmic mountings and has particular reference to an improved endpiece and temple connection for such mounting.

The principal object of the invention is to provide an improved endpiece connection for the lens holding rims that will have a long thread bearing so that it will not become easily stripped from use.

Another object of the invention is to provide simple, efficient and economical means for connecting the endpieces of the lens rims that will be sturdy and durable and not have a tendency to work loose and become wabbly.

Another object of the invention is to provide improved means by which the lenses may be replaced in the lens rims without entirely removing the fastening or holding means and thus loosening this part.

Another object of the invention is to provide means by which lenses may be replaced in the lens rims without interfering with the connection of the temple to the endpiece, and in which the temple may be removed without interfering with the lens holding arrangement of such endpiece.

Other objects and advantages of the invention will become apparent from the following description taken in connection with the accompanying drawings, and it will be apparent that changes may be made in the arrangements of parts and details of construction without departing from the spirit of the invention as expressed in the accompanying claims. I, therefore, do not wish to be limited to the exact arrangements shown and described as the preferred forms only have been set forth by way of illustration.

Referring to the drawings:

Fig. 1 shows a front elevation of an ophthalmic mounting embodying the invention;

Fig. 2 is a partial perspective view showing the construction of the endpiece with the parts in detached relationship;

Fig. 3 is a plan view of Fig. 2;

Fig. 4 is a cross section on line 4—4 of Fig. 3 showing the parts in separated relationship;

Fig. 5 is a cross section similar to Fig. 4 showing the parts in aligned relationship;

Fig. 6 is a cross section similar to Fig. 5 showing a modification;

Fig. 7 is a cross section similar to Fig. 5 showing another modification.

In the prior art it has been found from experience that the part of an ophthalmic mounting known as an endpiece or temple connection is subject to the most wear. In the first place it is necessary to separate the lens rim so that the lens may be inserted or removed, and in the next place provision must be made for the insertion and removal of the temple. The temple is an operating part subject to almost constant operation on its hinge connection. A great deal of difficulty has been experienced in preventing the rim connection and the temple connections from becoming loose and working out. Also it is desirable that the rim and temple connections be separately maintained so that the lens may be inserted or removed without interfering with the temple connection and vice versa. The great source of trouble in this connection has been to obtain sufficient thread area to maintain the holding members in any durable connection. If the lens connections become loose the lens will slip in the rim and this is of serious consequence where cylindrical lenses are used as it throws the axis of the lens out of line and spoils the prescriptive quality of the lens for a particular patient. If the temple connection becomes loose the frame will change its position before the eye, and this is also bad for the patient as far as his prescription is concerned.

It is, therefore, the principal object of my invention to provide simple and economical means to overcome these difficulties and maintain these parts in durable and sturdy relationship.

Referring to the drawings wherein similar reference characters denote corresponding parts throughout, a pair of lens rims 1 are secured together by means of the bridge member 2. These lens rims 1 are provided with endpieces 3 which form a separable joint to allow the lens rims 1 to be opened to replace the lenses therein, and also provide a hinge connection for the temple 4. The endpiece connection comprises the upper lug 5 and the lower lug 6. The upper lug 5 is secured to one end of the rim 1 and has a projecting barrel 7 having the screw-threaded bore 8. It will be noted that the lower end 9 of the barrel 7 is projected a considerable extent below the line of the butt 10 of the endpiece. The lower lug 6 is relatively large as compared with the upper lug 5. This lower lug 6 carries the hinge ears 11 and the recesses 12 to carry the hinge ears of the temple 4. It also has the butt contacting face 10 and the recess 13 into which the projecting end 9 of the barrel 7 fits. The lug 6 is of extremely sturdy construction and the recess 13 for the barrel 7 is centrally arranged to give the maximum strength. The barrel 7 is inserted in the recess 13 and the screw 14 is extended through the lug 6 and the screw-threaded bore 8 of the barrel 7, thus bringing the lugs 5 and 6 solidly together until the contacting faces 10 engage each other. The temple 4 is held in the lug 6 by means of the screw 15, the temple 4 having two hinge ears fitting into the lug 6 and providing a sturdy connection and an excess of bearing surface for the hinge members.

It will be noted that the screw 14 after it has been inserted in place is prevented from backing out by means of the shoulders 16 which are upset over the head of the screw 14. These upset portions 16 are just enough to prevent the head of the screw 14 backing out. The screw 14 is loosely held in its recess so that it may be turned without coming out. In this way the connection may be made without removing the screw 14 from its socket in the lug 6.

In Fig. 6 I have shown a modification wherein the barrel 7 is replaced by the tube 17, and in Fig. 7 another modification is shown wherein the tube 17 has a headed or shoulder portion 18. The tube 17 in Fig. 6 is soldered into the opening in the lug 5, whereas the tube 17 in Fig. 7 has a shouldered head and is loosely held in the lug 5.

From the foregoing description it will be seen that I have provided an extremely long thread bearing in the barrel 7 of the lug 5 which provides for the internal connection, and that I have provided a tight fit between the outside of the barrel 7 and the recess 13.

By reference to Fig. 3 it will be seen that the lug 5 is practically dove-tailed into the lug 6 owing to the shape of the line 19 of the contour of the lug 5 which fits into the lug 6. This holds the rims rigidly in alignment and does not allow them to work in any of the transverse planes.

The barrel 7 may be made integral with the lug 5 or it may be made separate therefrom and soldered thereto on the line 20.

From the foregoing description it will be seen that I have provided simple, efficient and economical means for producing a strong, durable, sturdy connection for the end pieces of ophthalmic mountings well adapted to obtain all the advantages of the invention.

Having described my invention, I claim:

1. In a device of the character described, a split lens rim, an abutment adjacent one end of the rim having an offset barrel portion extending beyond the line of joinder of the rim, a neck portion attached adjacent one end of the barrel and extending longitudinally along said barrel portion between said barrel and rim, a second abutment adjacent the other end of the rim having a terminal opening adapted to receive the barrel portion, a shoulder on the second abutment having a recess extending into the terminal opening and enclosing the neck portion when the barrel portion is in position and adapted to prevent side twisting of the rim on the barrel.

2. In a device of the character described, a split lens rim, an abutment adjacent one end of the lens rim having an offset threaded barrel portion extending beyond the line of joinder of the rim, a neck portion attached adjacent one end of the barrel and extending longitudinally along said barrel portion between said barrel and rim, a second abutment adjacent the other end of the rim having a terminal opening adapted to receive the barrel portion, a shoulder on the second abutment having a recess extending into the terminal opening and enclosing the neck portion when the barrel portion is in position, and a screw member engaging the second abutment and barrel, said neck enclosing recess being adapted to prevent side twisting of the rim on the barrel.

3. In a device of the character described, a separated lens rim, an abutment adjacent one end of the rim having an offset tubular member extending beyond the line of joinder of the rim, a neck portion adjacent one end of the tube and extending between said tube and rim, a second abutment adjacent the other end of the rim having an opening extending below the line of joinder of the rim adapted to receive the tubular member and having an opening therein extending into the first opening and of a depth to receive the neck portion when the tube is in position in its opening and adapted for use in preventing side twisting of the rim on the tube.

4. In a device of the character described, a separated lens rim, an abutment adjacent one end of the rim having an offset tubular member extending beyond the line of joinder of the rim, a neck portion adjacent one end of the tube and extending between said tube and rim, a second abutment adjacent the other end of the rim having an opening extending below the line of joinder of the rim adapted to receive the tubular member and having an opening extending into the first opening and of a depth to receive the neck portion when the tube is in position in its opening to prevent side twisting of the rim on the tube and a screw member engaging the second abutment and tube.

WILLIAM H. BOUTELLE.